United States Patent
Lee et al.

(10) Patent No.: US 11,535,957 B2
(45) Date of Patent: Dec. 27, 2022

(54) METHOD FOR PRODUCING POLYACRYLONITRILE-BASED FIBER AND POLYACRYLONITRILE-BASED COPOLYMER USED THEREIN

(71) Applicant: LG CHEM, LTD., Seoul (KR)

(72) Inventors: Jeong Kyu Lee, Daejeon (KR); Chang Hun Kim, Daejeon (KR); In Young Song, Daejeon (KR); Jeong Hun Cho, Daejeon (KR); Jong Soo Do, Daejeon (KR); Sung Joon Oh, Daejeon (KR); Joon Hee Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 862 days.

(21) Appl. No.: 16/335,076

(22) PCT Filed: Nov. 22, 2017

(86) PCT No.: PCT/KR2017/013357
§ 371 (c)(1),
(2) Date: Jul. 24, 2019

(87) PCT Pub. No.: WO2018/097602
PCT Pub. Date: May 31, 2018

(65) Prior Publication Data
US 2020/0149196 A1     May 14, 2020

(30) Foreign Application Priority Data
Nov. 23, 2016 (KR) .................. 10-2016-0156871

(51) Int. Cl.
*D01F 9/22*       (2006.01)
*C08F 220/04*   (2006.01)
(Continued)

(52) U.S. Cl.
CPC .............. *D01F 9/22* (2013.01); *C08F 220/04* (2013.01); *C08F 220/18* (2013.01); *C08F 220/44* (2013.01); *C08F 220/1804* (2020.02)

(58) Field of Classification Search
CPC ........ D01F 9/22; C08F 220/04; C08F 220/18; C08F 220/44; C08F 220/1804
(Continued)

(56) References Cited

U.S. PATENT DOCUMENTS

| | | | | |
|---|---|---|---|---|
| 5,401,576 A | * | 3/1995 | Yoon ...................... | D01D 5/42 |
| | | | | 162/157.5 |
| 7,964,134 B2 | * | 6/2011 | Wilkinson .............. | D01F 11/14 |
| | | | | 264/342 RE |

(Continued)

FOREIGN PATENT DOCUMENTS

| CN | 104372445 A | 2/2015 |
|---|---|---|
| CN | 104611779 A | 5/2015 |

(Continued)

*Primary Examiner* — Michael M. Bernshteyn
(74) *Attorney, Agent, or Firm* — Dentons US LLP (57) ABSTRACT

The present invention relates to a method for producing a polyacrylonitrile-based fiber, wherein the method polymerizes a monomer mixture including an acrylonitrile-based monomer, a carboxylic acid-based comonomer, and an acrylate-based comonomer, wherein the acrylate-based comonomer includes the steps of producing a polyacrylonitrile-based copolymer so as to be included in an amount of 4 to 20 parts by weight based on 100 parts by weight of the monomer mixture, fiberizing the polyacrylonitrile-based copolymer, oxidizing and stabilizing the fiberized polyacrylonitrile-based copolymer, which may control the oxidation stabilization reaction, particularly the cyclization reaction. Accordingly, the energy consumption of the oxidation stabilization reaction may be reduced, economical efficiency of the production of polyacrylonitrile-based fiber may be (Continued)

obtained, and the physical and mechanical properties of the carbon fiber may be improved.

4 Claims, 10 Drawing Sheets

(51) Int. Cl.
    *C08F 220/18*     (2006.01)
    *C08F 220/44*     (2006.01)

(58) Field of Classification Search
    USPC ........................................................ 264/29.2
    See application file for complete search history.

(56) References Cited

U.S. PATENT DOCUMENTS

| | | | | |
|---|---|---|---|---|
| 8,372,323 | B2* | 2/2013 | Wilkinson | B29D 99/0078 264/210.8 |
| 2009/0224420 | A1 | 9/2009 | Wilkinson | |
| 2010/0047153 | A1* | 2/2010 | Plee | D01F 9/22 423/447.2 |
| 2011/0059314 | A1* | 3/2011 | Wilkinson | B29D 99/0078 425/71 |
| 2012/0322332 | A1* | 12/2012 | Paulauskas | C08F 122/30 525/383 |
| 2013/0281650 | A1 | 10/2013 | Wilkinson | |
| 2015/0252501 | A1* | 9/2015 | Paulauskas | D06M 10/08 525/383 |
| 2017/0002482 | A1 | 1/2017 | Wilkinson | |

FOREIGN PATENT DOCUMENTS

| | | | |
|---|---|---|---|
| JP | H07-013325 | B2 | 2/1995 |
| JP | 09-31758 | A | 2/1997 |
| JP | 2869085 | B2 | 12/1998 |
| JP | 11-012856 | A | 1/1999 |
| JP | 11-241230 | A | 9/1999 |
| JP | 2006-257580 | A | 9/2006 |
| JP | 2012-500910 | A | 1/2012 |
| KR | 10-0168738 | B1 | 1/1999 |
| KR | 10-2011-0044922 | A | 5/2011 |
| KR | 10-2011-0078245 | A | 7/2011 |
| KR | 10-2011-0078246 | A | 7/2011 |
| KR | 20110078245 | A * | 7/2011 |
| KR | 20110078245 | A * | 7/2011 |
| KR | 10-2012-0115029 | A | 10/2012 |

\* cited by examiner

METHOD FOR PRODUCING POLYACRYLONITRILE-BASED FIBER AND POLYACRYLONITRILE-BASED COPOLYMER USED THEREIN

This application claims the benefit of Korean Patent Application No. 10-2016-0156871, filed on Nov. 23, 2016, in the Korean Intellectual Property Office, the disclosure of which is incorporated herein in its entirety, by reference.

TECHNICAL FIELD

The present invention relates to a method for producing a polyacrylonitrile-based fiber and a polyacrylonitrile-based copolymer used therein.

BACKGROUND

Due to certain beneficial properties such as light weight, high strength, and high heat resistance, carbon fiber is being widely applied to a variety of industrial fields ranging from aerospace to the construction industry. For example, carbon fiber has been used in building materials, concrete structures, seismic reinforcements, alternative energy and green energy fields (e.g., CNG baths, wind turbine blades, centrifugal rotors and fly foils), high-speed transportation equipment such as ships and vehicles, deep seabed oil exploration, high performance devices, medical welfare devices, electric conduction applications, and super heat resistant applications. Carbon fiber is growing as a material for making the foundation of a new era as a third general-purpose material capable of replacing iron and aluminum by taking advantage of its unique features. In particular, it is expected that the used amount of carbon fiber used will be increase in various high-tech material fields, such as the use of carbon fiber as an aircraft component material in Boeing 787 and Airbus 380 aircraft, which have recently been developed as a supersonic aircraft.

Generally, a high heat treatment temperature of about 1300° C. or higher is applied to the carbon fiber, and the characteristics of the carbon fiber can be greatly changed according to the setting of carbonization process factors. Also, the process is difficult, the productivity is low, and the production cost is high, so the price of the product is relatively high.

A polyacrylonitrile-based fiber (hereinafter referred to as a PAN fiber), which is known to be the most suitable precursor for the production of the carbon fiber, may be converted to a carbon fiber or a graphite fiber through a series of stabilization (or oxidation), carbonization, and optionally, graphitization processes, and a series of surface treatment and sizing treatment processes.

The stabilization process (or the chlorination process or the oxidation stabilization process) refers to a heat treatment process performed in a temperature range of about 200° C. to about 400° C. while applying a constant tension in an oxidizing or air atmosphere. In this process, the PAN fiber causes a great chemical change. The PAN fiber has a physically and thermally stable structure even at a high heat treatment temperature such as a partial carbonization or graphitization condition performed subsequently.

On the other hand, in terms of the price structure of carbon fibers, a PAN fiber occupies the largest proportion of the cost, at 43%, and the stabilization process with a very slow reaction rate and high energy consumption accounts for 18% of the cost. Therefore, it is necessary to secure low cost PAN fiber technology for carbon fiber production cost reduction, and stabilization and carbonization process technology requiring less energy consumption is required.

In the stabilization reaction, a cyclization, a dehydrogenation reaction, an aromatization reaction, an oxidation reaction, and a cross-linking reaction occur. Through these reaction, a ladder structure having a heat-resistant conjugate structure is formed.

The cyclization reaction is an exothermic reaction, which is preferable to proceed at a low temperature in order to reduce degradation and economical advantage, and is important to easily disperse the amount of heat released to prevent fiber damage (low shrinkage).

Korean Patent Laid-Open Publication No. 10-2011-0078246 is indicative of the state of the art.

DISCLOSURE OF THE INVENTION

Technical Problem

An aspect of the present invention provides a method for producing a polyacrylonitrile-based fiber in which an oxidation stabilization reaction, particularly a cyclization reaction, may be controlled, thereby reducing energy consumption of the oxidation stabilization reaction in the production process of a carbon fiber, obtaining the economical efficiency and improving the physical and mechanical properties of a carbon fiber, and a polyacrylonitrile-based copolymer applicable to produce a polyacrylonitrile-based fiber.

Technical Solution

According to an aspect of the present invention, there is provided a method for producing a polyacrylonitrile-based fiber, the method including the steps of: (S1) producing a polyacrylonitrile (PAN)-based copolymer by polymerizing a monomer mixture including an acrylonitrile-based monomer, a carboxylic acid-based comonomer, and an acrylate-based comonomer represented by Formula 1 below such that the acrylate-based comonomer is included in an amount of 4 to 20 parts by weight, based on 100 parts by weight of the monomer mixture; (S2) fiberizing the polyacrylonitrile-based copolymer; and (S3) oxidizing and stabilizing the fiberized polyacrylonitrile-based copolymer.

[Formula 1]

In Formula 1, $R_1$ is a linear or branched alkyl group having 3 to 5 carbon atoms, and $R_2$ is hydrogen or a methyl group.

Advantageous Effects

According to the present invention, a specific polyacrylonitrile-based copolymer may be applied, thereby controlling the oxidation stabilization reaction, particularly the cyclization reaction. Accordingly, the energy consumption of the oxidation stabilization reaction may be reduced, economical efficiency of the polyacrylonitrile-based fiber production may be obtained, and the physical and mechanical properties of the carbon fiber produced therefrom may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

1. Method for Producing Polyacrylonitrile-Based Fiber

According to an embodiment of the present invention, a method for producing polyacrylonitrile-based fiber, the method includes the steps of: (S1) producing a polyacrylonitrile (hereinafter referred to as 'PAN')-based copolymer by polymerizing a monomer mixture including an acrylate-based monomer, a carboxylic acid-based comonomer and an acrylate-based comonomer represented by Formula 1 below such that the acrylate-based comonomer is included in an amount of 4 to 20 parts by weight based on 100 parts by weight of the monomer mixture; (S2) fiberizing the PAN-based copolymer; and oxidizing and stabilizing the fiberized PAN-based copolymer.

[Formula 1]

In Formula 1, $R_1$ is a linear or branched alkyl group having 3 to 5 carbon atoms, and $R_2$ is hydrogen or a methyl group.

Step (S1) of Producing PAN-Based Copolymer

The PAN-based copolymer may be a copolymer which is produced by copolymerizing at least one comonomer with an acrylonitrile-based monomer. Specifically, the PAN-based copolymer may be produced by copolymerizing the monomer mixture of the acrylonitrile-based monomer, the carboxylic acid-based comonomer and the acrylate-based comonomer.

The acrylonitrile-based monomer may include acrylonitrile, and examples of the carboxylic acid-based comonomer may include acrylic acid, methacrylic acid, ethacrylic acid, itaconic acid, crotonic acid, citraconic acid, maleic acid, mesaconic acid, or a mixture thereof, and preferably, the itaconic acid may be applied. In this case, the effect of further lowering the onset temperature of the oxidation stabilization reaction to be performed later may be improved.

In addition, the acrylate-based comonomer may be represented by Formula 1 below.

[Formula 1]

In Formula 1, $R_1$ is a linear or branched alkyl group having 3 to 5 carbon atoms, and $R_2$ is hydrogen or a methyl group.

The acrylate-based copolymer may generally apply methyl acrylate, but methyl acrylate has few factors that may control the reaction in the subsequent oxidation stabilization reaction, so that the effect of energy reduction and the like may not be obtained.

Thus, in the production method according to the present invention, acrylate or methacrylate having a linear or branched alkyl group having 3 to 5 carbon atoms with a relatively large steric hindrance may be applied unlike methyl acrylate, and preferably the number of carbon atoms of the alkyl group may be 4, and butyl acrylate may be applied for a slightly improved effect. As described above, when a material having a relatively larger steric hindrance than methyl acrylate is applied, the reaction may be controlled in the oxidation stabilization reaction, particularly the cyclization reaction, so that the effect desired in the present invention may be obtained.

The copolymerization reaction is performed by mixing the monomers as described above, wherein when the monomers are mixed to form a mixture, based on 100 parts by weight of the monomer mixture, the acrylonitrile-based monomer may be included in an amount of 75 to 95 parts by weight, the carboxylic acid-based comonomer may be included in an amount of 0.1 to 5 parts by weight, and particularly, the acrylate-based comonomer may be included in an amount of 4 to 20 parts by weight.

The acrylate-based comonomer may serve as a factor capable of controlling the cyclization reaction. The amount of 4 to 20 parts by weight is preferably applied for effective control of the cyclization reaction, 4 to 13 parts by weight, or 7 to 20 parts by weight may be preferably applied depending on the behavior of the cyclization reaction, or 7 to 13 parts by weight may be applied.

In addition, the carboxylic acid-based comonomer may act as an important role in that the onset temperature of the oxidation stabilization reaction is reduced. The amount may be 0.1 to 5 parts by weight, preferably 0.5 to 2 parts by weight, 0.1 to 3 parts by weight, preferably 0.5 to 2 parts by weight, and 0.7 to 1.5 parts by weight.

The copolymer reaction may be performed by using the monomer mixture. The copolymer reaction in this case may be performed at a temperature, a pressure, an atmosphere, etc., which are applied in the art, and the conditions of the copolymerization reaction are not particularly limited.

Step (S2) of Fiberizing

The step of fiberizing a PAN-based copolymer may be a process in which a spinning process or the like is applied to the PAN-based copolymer and thus allows formation of a fibrous shape.

More specifically, the produced PAN-based copolymer is added to a solvent capable of dissolving the PAN-based copolymer such as dimethylsulfoxide, dimethylformamide, dimethylacetamide and the like, and the mixture may be dissolved to produce a spinning undiluted solution. It may be preferable to use a solution polymerization method in the production of the PAN-based copolymer, wherein the same solvent is used for polymerization and spinning, thus a process in which the obtained PAN-based copolymer is separated and then dissolved in the spinning solvent again may be unnecessary.

It may be preferable that the concentration of the PAN-based copolymer in the spinning undiluted solution is adjusted to 10 to 40% by weight from the viewpoint of stability of the spinning undiluted solution. Before spinning the undiluted solution, it is preferable that the solution is filtered with a filter having openings about 1 µm or less, thus removing impurities which are mixed from the raw material of the polymerization reaction and each process. Using such a filtering procedure, the strength of the resulting carbon fiber obtained may be improved.

A spinning method may include dry spinning, wet spinning, or dry-wet spinning, with a wet or dry-wet spinning method preferably utilized. For improving the compactness of a carbon fiber precursor fiber and the mechanical properties, it may be desirable to use dry-wet spinning.

The present invention may be initiated by adding the spinning undiluted solution into a coagulating bath during wet or dry-wet spinning, and solidifying the solution. The coagulating bath may preferably include a solvent such as dimethylsulfoxide, dimethylformamide, and dimethylacetamide, which are used as the solvent of the spinning undiluted solution, and a coagulating-promoting agent. The coagulating-promoting agent may use a material having compatibility with the solvent used in the spinning undiluted solution without dissolving the PAN-based copolymer. As an example, water may be used.

After the coagulating process, a water washing process and a stretching process may be applied. The two processes may be carried out in a reactor or a reaction bath provided with 5 to 15 baths depending on the design. The water washing and stretching may be carried out sequentially, successively or in reverse order, and may be a plurality of processes. Also, the water washing and stretching may appropriately adjusted the change of order, the number of times of execution of each process, and the like, and each process may be performed at least once.

In addition, the coagulating, water washing, and stretching are classified according to the function to be performed. The water washing and the stretching may be performed simultaneously in one reaction bath, and the water washing or the stretching may be independently performed several times. Thus, there is no particular limitation on the arrangement and order of the water washing process and the stretching process.

The stretching process may be preferably performed in a single or multiple stretching baths controlled at a temperature of 30 to 98° C., and a stretching magnification may be preferably 1 to 5 times, more preferably 2 to 4 times.

In the spinning process, an emulsifier composed of silicone and the like may be added in order to prevent adhesion between fibers. A silicone emulsifier may use modified silicone, and it may be preferable to add an amino-modified silicone emulsifier having high heat resistance.

In addition, a process such as dry heat treatment or steam stretching may be further performed, and the spinning process may be performed through such a process, and the PAN-based copolymer fiberized thereby may be obtained.

Step (S3) of Oxidizing and Stabilizing

The exothermic reaction by the cyclization reaction, the oxidation reaction and the dehydrogenation reaction during the oxidation stabilization process occurs suddenly for a short time, so that it is difficult to control. The exothermic reaction may cause cleavage of the PAN-based copolymer chain, and as a result, the physical properties of the carbon fiber may be deteriorated.

The oxidation stabilization process, which is an intermediate step in the production method of the carbon fiber as described above, is carried out by cyclization, oxidation, dehydrogenation and the like, are performed by heat treatment in a temperature range of about 180° C. to about 350° C. while applying a constant pressure in an oxidizing or air atmosphere. In the oxidation stabilization process, low-molecular materials are removed from components constituting the fiberized PAN-based copolymer and a large chemical change is caused. Also, this oxidation stabilization process is a process for imparting flame retardancy, such that burning does not occur even when contacting a flame, which is an important process for influencing properties such as physical and mechanical properties of the carbon fiber.

In addition, the PAN-based copolymer fiberized during the oxidation stabilization process transitions from yellow to brown, and finally becomes black. When the holding time in the heat-treated zone of the oxidation stabilization is too long, the fiberized PAN-based copolymer may burn due to peroxidation, so that the control of the oxidation stabilization process may be an important factor.

According to an embodiment of the present invention, the carboxylic acid-based comonomer and the acrylate-based comonomer as described above are applied in order to control the oxidation stabilization process, wherein the acrylate-based comonomer represented by Formula 1 may be applied.

The carboxylic acid-based comonomer may initiate the cyclization reaction at a lower temperature, and be stabilized at a lower temperature, than in conventional oxidation stabilization processes. Further, acrylate or methacrylate having an alkyl group having 3 to 5 carbon atoms with relatively large steric hindrance is applied without applying an acrylate-based comonomer such as methyl acrylate with small steric hindrance as in the existing case, so that the maximum exothermic temperature of the reaction may be controlled at a low temperature, and at the same time, the cyclization reaction may be performed stably.

The acrylate-based copolymer may need to control an amount, and may has 4 to 20 parts by weight based on 100 parts by weight of the monomer mixture. However, depending on the case, about 4 to 13 parts by weight is preferably applied in order to lower the maximum temperature of the cyclization reaction, and about 7 to 20 parts by weight may be preferably applied in terms of stable reaction.

That is, when acrylate or methacrylate having an alkyl group having 3 to 5 carbon atoms is used as the acrylate-based copolymer, the cyclization reaction may be performed stably at a low temperature, and the reaction having a stable heat flow may be performed.

In addition, when acrylate or methacrylate having an alkyl group with 3 to 5 carbon atoms is used as the acrylate-based copolymer, the change in time of conversion increases with increasing the reaction temperature during the isothermal cyclization reaction, compared with applying other comonomers having less steric hindrance. Also, the time point at which the reaction is most actively observed is clearly ascertainable and the reaction may be controlled, and the total calorific value may be increased while the calorific value per unit time is small, so that a more complete and stable cyclization reaction may be achieved.

In addition, the activation energy may be greatly increased to prevent the radical reaction from occurring explosively in the cyclization reaction, and the calorific vale per unit time and the like may be sufficiently controlled as described above to perform a stable cyclization reaction. As a result, the physical properties of the carbon fiber may be improved.

2. Polyacrylonitrile-Based Copolymer

According to an embodiment of the present invention, the polyacrylonitrile-based copolymer is a polyacrylonitrile-based copolymer for a carbon fiber precursor, wherein based on 100 parts by weight of all the repeat units in the copolymer, the polyacrylonitrile-based copolymer includes a) 75 to 95 parts by weight of repeat unit derived from an acrylonitrile-based monomer; b) 0.1 to 5 parts by weight of repeat unit derived from a carboxylic acid-based comonomer; and c) 4 to 20 parts by weight of repeat unit derived from the acrylate-based comonomer represented by Formula 1 below.

[Formula 1]

In formula 1, $R_1$ is a linear or branched alkyl group having 3 to 5 carbon atoms, and $R_2$ is hydrogen or a methyl group.

The description of the polyacrylonitrile-based copolymer is the same as that described in the method for producing a polyacrylonitrile-based fiber, and thus the description thereof will not be provided herein.

The PAN-based copolymer can be utilized as a carbon fiber precursor in the production of the PAN-based fiber, which may serve as a factor capable of controlling the oxidation stabilization reaction as described above.

3. Method for Producing Carbon Fiber

According to an embodiment of the present invention, the method for producing a carbon fiber includes the step of carbonizing the PAN-based fiber produced by the production method of the above-described PAN-based fiber.

The method for producing a PAN-based fiber has been described above, and thus the description thereof will not be provided herein.

The step of carbonizing may be generally performed in an inert atmosphere, and a gas such as nitrogen, argon, or xenon may be applied to a material forming the inert atmosphere. Further, the carbonization temperature in the step of carbonizing may be about 1,000° C. or higher, preferably 1,200° C. or higher, and the upper limit thereof may be 2,000° C. or lower, preferably 1800° C. or lower.

The step of carbonizing may apply a general carbonization process applied in producing the carbon fiber, and is not particularly limited to the above conditions.

When the method for producing a PAN-based fiber according to the present invention is applied as described above, the resulting carbon fiber may have the improved physical and mechanical properties, and the strength thereof may be especially excellent.

EXAMPLES

Hereinafter, the present invention will be described in more detail by examples. However, the following examples are for illustrative purposes, and the scope of the invention is not limited thereto only.

Example 1

94 parts by weight of acrylonitrile (AN), 1 parts by weight of itaconic acid (IA) and 5 parts by weight of butyl acrylate (BA) were added to a 3 L glass reactor, the copolymerization reaction was performed under conditions of a solution polymerization method using a DMSO solvent and an initiator of AIBN to produce a PAN copolymer. The spinning undiluted solution having a concentration of 22% was adjusted to 50° C., and the produced PAN-based copolymer was spun under a condition of wet spinning in a bath composed of an aqueous solution of 55% DMSO, and then the cyclization reaction was performed to produce a PAN-based fiber, which is a carbon fiber precursor, and which may be converted to a carbon fiber by a carbonization process.

Examples 2 to 4

Under the same conditions except that the amount of the monomer as shown in Example 1 and Table 1 below was applied, the copolymerization reaction was performed and the spinning and oxidation stabilization reaction were performed, thereby producing the PAN-based fiber.

Comparative Examples 1 to 4

In the same method except that in Examples 1 to 4, methyl acrylate (MA) was applied instead of butyl acrylate to perform the copolymerization reaction, the copolymerization reaction, the spinning and the oxidation stabilization reaction were performed, thereby producing the PAN-based fiber.

The kinds and amounts of the monomers and comonomers applied in Examples and Comparative Examples are shown in Table 1 below.

TABLE 1

|  | AN (parts by weight) | IA (parts by weight) | MA (parts by weight) | BA (parts by weight) |
|---|---|---|---|---|
| Example 1 | 94 | 1 | — | 5 |
| Example 2 | 89 | 1 | — | 10 |
| Example 3 | 84 | 1 | — | 15 |
| Example 4 | 79 | 1 | — | 20 |
| Comparative Example 1 | 94 | 1 | 5 | — |
| Comparative Example 2 | 89 | 1 | 10 | — |
| Comparative Example 3 | 84 | 1 | 15 | — |
| Comparative Example 4 | 79 | 1 | 20 | — |

Experimental Example 1. Analysis of Cyclization Reaction Using Differential Scanning Calorimetry (DSC)

Figure 1:
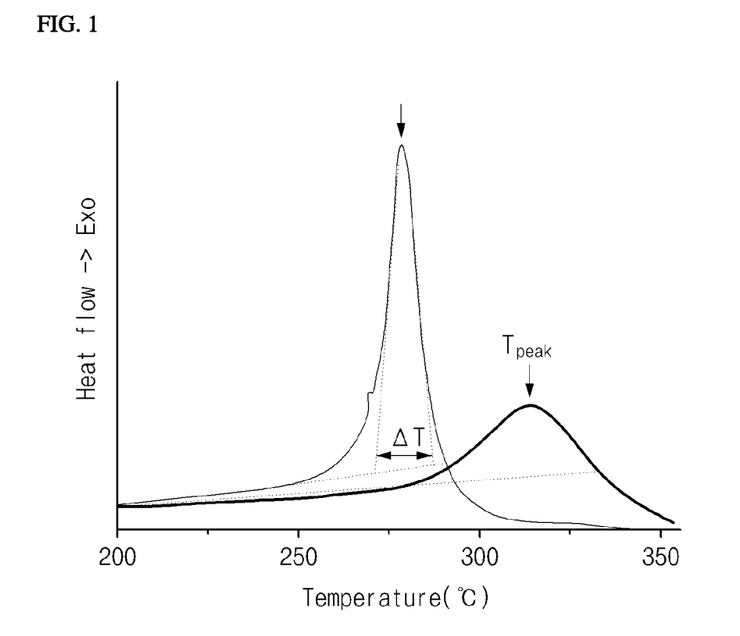
FIG. 1 is a graph illustrating the definition of the peak temperature and peak width of a reaction during the differential scanning calorimetry of a cyclization reaction of polyacrylonitrile-based fibers.

DSC experiments were conducted in order to evaluate the cyclization reaction behavior of PAN-based copolymers according to comonomer types and compositions. The thermogram of the cyclization reaction was measured by raising the temperature range of 30° C. to 350° C. at a rate of 10° C./min under a nitrogen atmosphere (20 mL/sec) using a DSC 8000 manufactured by Perkin Elmer. An exothermic peak of the cyclization reaction was assigned from the measured caloric value change, and the onset/end temperature of the peak was defined as shown in FIG. 1, and the peak temperature ($T_p$) and the peak broadness ($\Delta T = T_{onset} - T_{end}$) were derived. The results are shown in Table 2 and FIGS. 2 and 3.

TABLE 2

|  | AN (parts by weight) | IA (parts by weight) | MA (parts by weight) | BA (parts by weight) | $T_p$ | $\Delta T$ |
|---|---|---|---|---|---|---|
| Example 1 | 94 | 1 | — | 5 | 278 | 18 |
| Example 2 | 89 | 1 | — | 10 | 289 | 48 |
| Example 3 | 84 | 1 | — | 15 | 302 | 63 |
| Example 4 | 79 | 1 | — | 20 | 314 | 70 |
| Comparative Example 1 | 94 | 1 | 5 | — | 289 | 35 |
| Comparative Example 2 | 89 | 1 | 10 | — | 292 | 44 |
| Comparative Example 3 | 84 | 1 | 15 | — | 299 | 34 |
| Comparative Example 4 | 79 | 1 | 20 | — | 305 | 32 |

Figure 2:
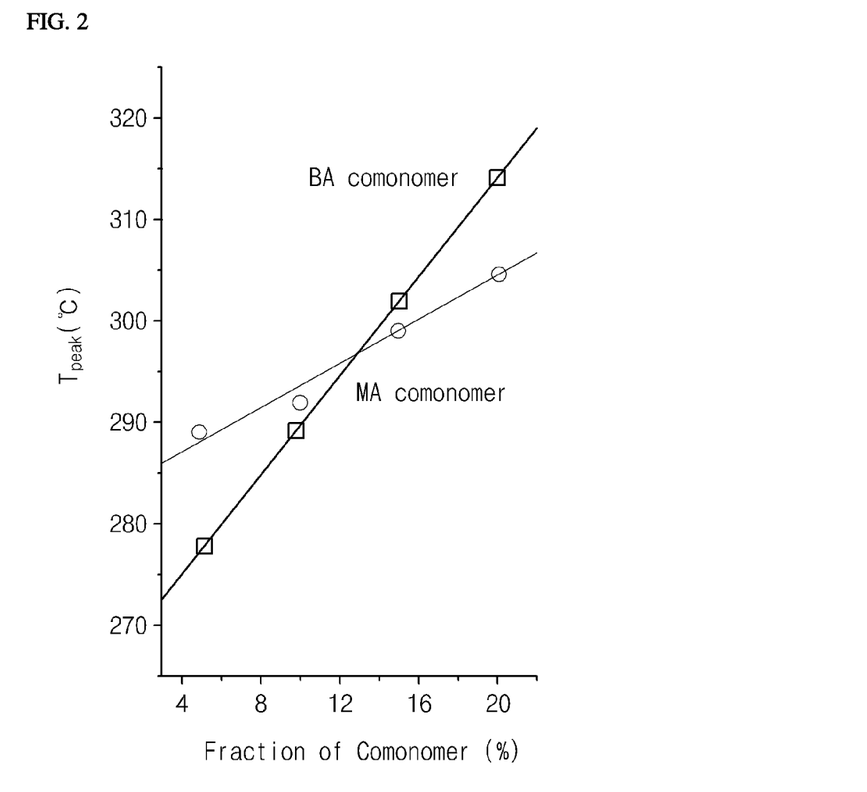
FIG. 2 is a graph illustrating changes in peak temperature depending on kinds and amounts of comonomers with respect to the cyclization reaction in Examples and Comparative Examples.
Figure 3:
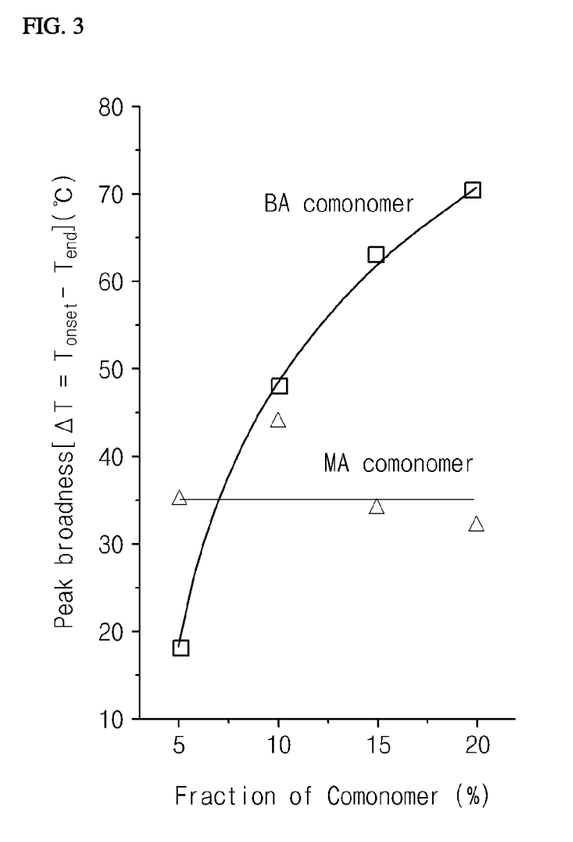
FIG. 3 is a graph illustrating changes in peak broadness depending on kinds and amounts of comonomers with respect to the cyclization reaction in Examples and Comparative Examples.

Referring to Table 2 and FIGS. 2 and 3, it was ascertained that the case of using the PAN-based copolymer produced by including butyl acrylate had larger change in peak temperature depending on the amount of the comonomer than the case of using the PAN-based copolymer produced by including a relatively non-bulky methyl acrylate, and showed a large increase in peak width. That is, it was ascertained that when butyl acrylate was applied, the peak temperature of the cyclization reaction could be freely controlled through the amount thereof, and the peak broadness could also be freely controlled by adjusting the amount thereof. Thus, it may be found that when butyl acrylate was applied, the cyclization reaction was controlled.

In addition, it was ascertained that in the control of the cyclization reaction, the case of further adding butyl acrylate was further added in 4 to 13 parts by weight has a peak temperature lower than the case of using methyl acrylate and thus the cyclization reaction could be performed even at a low temperature. Also, it was ascertained that the case of adjusting butyl acrylate to 7 to 20 parts by weight could have a considerably wider peak broadness than the case of using methyl acrylate to perform the cyclization reaction without rapid change in heat flow.

Experimental Example 2. Analysis of Isothermal Cyclization Reaction Using Differential Scanning Calorimetry (DSC)

1) DSC Analysis of Isothermal Cyclization Reaction

Figure 4:
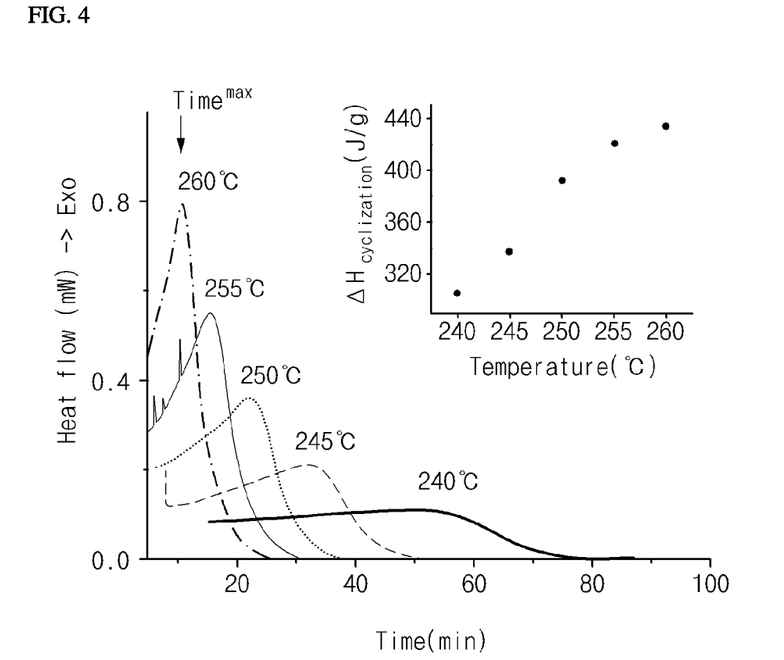
FIG. 4 is a graph analyzing calorific values depending on time by the reaction temperature with respect to the isothermal cyclization reaction in Example 2.
Figure 5:
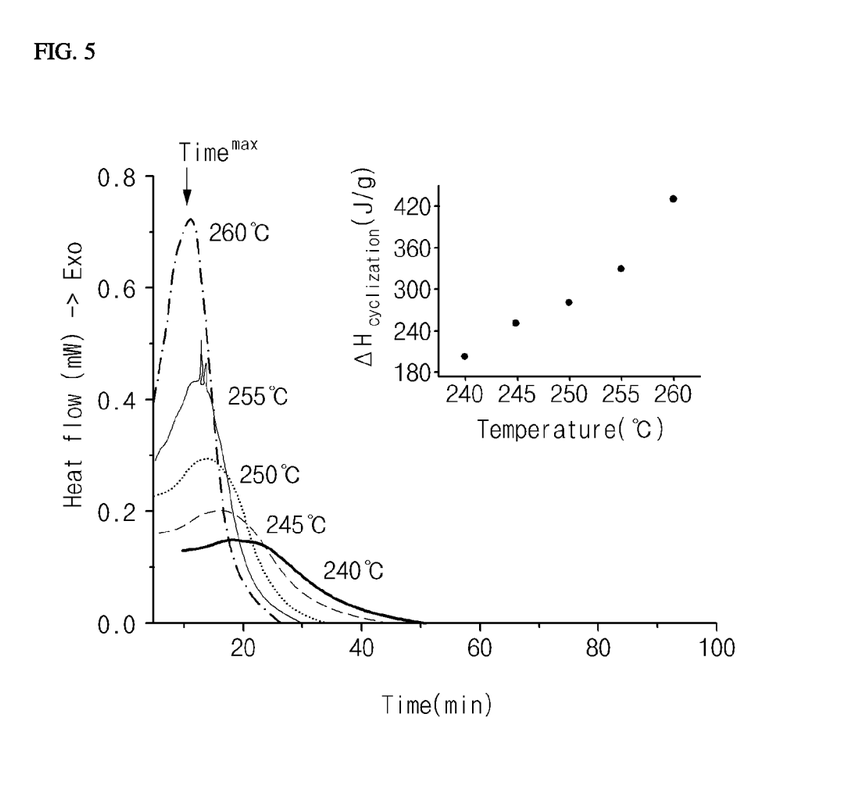
FIG. 5 is a graph analyzing calorific values depending on time by the reaction time with respect to the isothermal cyclization reaction in Comparative Example 2.

For the qualitative and quantitative understanding of the cyclization reaction behavior of the PAN-based copolymer depending on the kinds of comonomers, the isothermal cyclization reaction was performed by DSC analysis (the same equipment and condition as in Experimental Example 1) with respect to Example 2 and Comparative Example 2, and the calorific value of the cyclization reaction depending on time was measured at specific temperatures (260° C., 255° C., 250° C., 245° C. and 240° C.) and the result was illustrated in FIGS. 4 (Example 2) and 5 (Comparative Example 2). Further, the change in time max value depending on the cyclization reaction temperature with respect to Example 2 and Comparative Example 2 was illustrated in FIG. 6.

Figure 6:
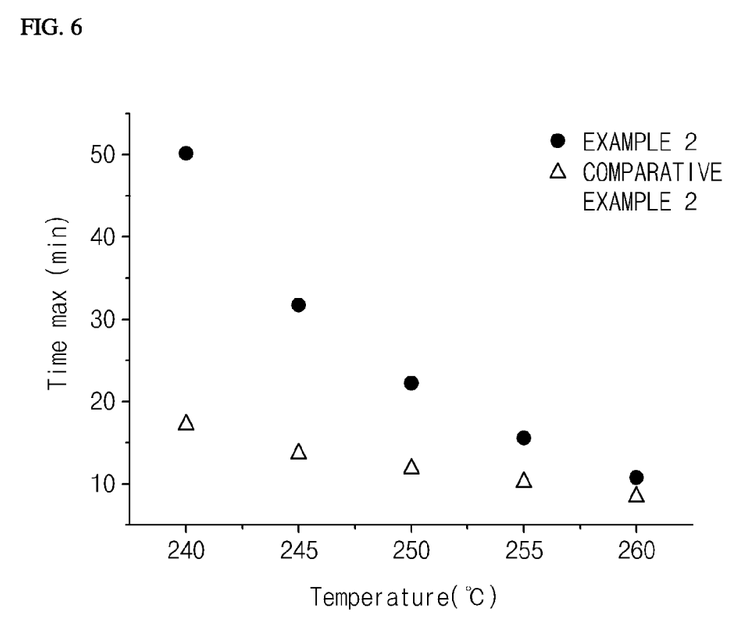
FIG. 6 is a graph measuring the time at which the reaction is maximally performed depending on the reaction temperature with respect to the isothermal cyclization reaction in Example 2 and Comparative Example 2.

Referring to FIGS. 4 to 6, it may be seen that in Example 2, the time max, which is a time point at which the reaction actively occurs, is more clearly differentiated depending on time than in Comparative Example 2, and thus may be controlled. See the internal graph of FIGS. 4 and 5, it may be ascertained that Example 2 shows a significantly large calorific value (ΔHcyclization) compared to Comparative Example 2. Accordingly, it could be ascertained that the cyclization reaction of Example 2 was more completely performed than that of Comparative Example 2.

Referring to graphs in FIGS. 4 and 5, it may be seen that the calorific values per time unit by each temperature are small in that the curve of Example 2 exhibits more broadly, but the calorific value of the overall reaction is larger. Thus, it may be further ascertained that the cyclization reaction in Example 1 occurs more stably and completely without being explosive than that in Comparative Example 2.

2) Kinetic Evaluation of Cyclization Reaction

Figure 7:
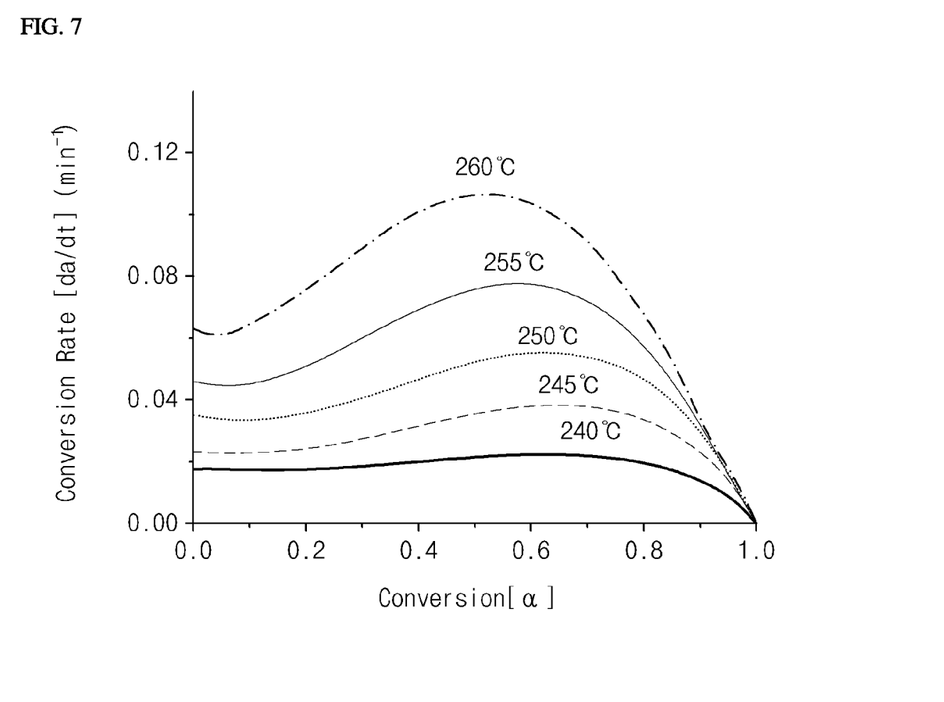
FIG. 7 is a graph illustrating a conversion rate depending on the conversion of the isothermal cyclization reaction in Example 2.
Figure 8:
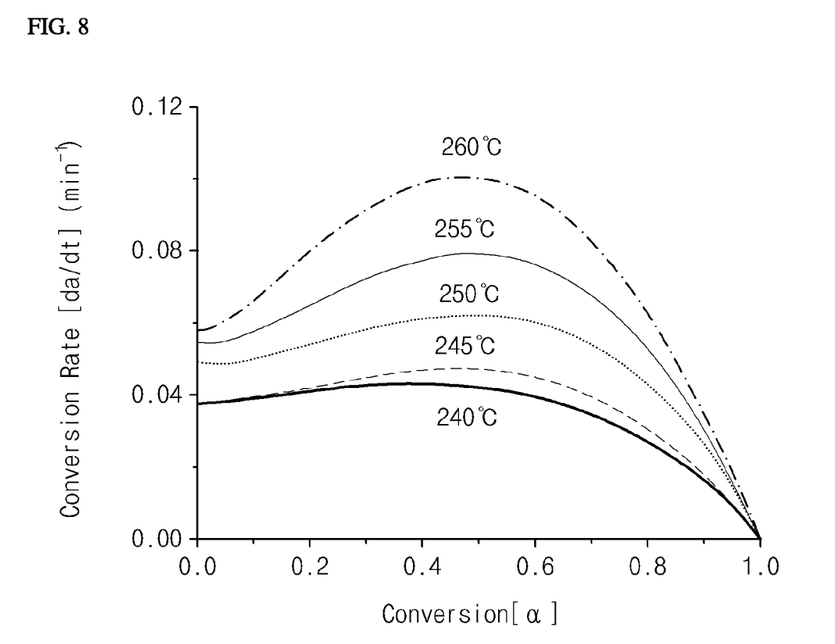
FIG. 8 is a graph illustrating a conversion rate depending on the conversion of the isothermal cyclization reaction in Comparative Example 2.

Based on the DSC analysis results (calorific value) of the isothermal cyclization reaction, the change in conversion and conversion rate of the cyclization reaction depending on time was derived and is illustrated in FIGS. 7 (Example 2) and 8 (Comparative Example 2).

The cyclization reaction is generally performed by a mechanism capable of applying an autocatalytic model, so that FIGS. 7 and 8 are graphs illustrating the results fitted by using the conversion rate and the conversion obtained by the DSC analysis results in Equation 1 below in that a formula such as Equation 1 below may be applied.

$$\frac{d\alpha}{dt} = (k_1 + k_2 \alpha^m)(1 - \alpha^n), \; \alpha = \frac{\Delta H_f}{\Delta H} \qquad \text{[Equation 1]}$$

In Equation 1, dα/dt is a conversion rate, $K_1$ and $k_2$ are reaction rate constants, α is a conversion, $\Delta H_f$ is the enthalpy of the cyclization reaction depending on each time in FIGS. 4 and 5, H is the enthalpy of the cyclization reaction for the whole time in FIGS. 4 and 5, and each of the $\Delta H_f$ and H is a value calculated through graph integration.

Based on the results illustrated in FIGS. 7 and 8, it was ascertained that the sum of m and n, which are parameters representing the order of the cyclization reaction, has a value of 2 to 3. Thus, it was ascertained that the cyclization reaction in the oxidation stabilization process of the PAN-based fiber was a reaction capable of applying the autocatalytic model.

3) Derivation of Activation Energy

The reaction rate constants k1 and k2 were obtained by using the evaluation results of the above 2), and an Arrhenius plot was applied in order to evaluate the temperature dependence of the reaction rate constants. The results were illustrated in FIGS. 9 (Example 2) and 10 (Comparative Example 2), and the activation energy obtained therefrom was shown in Table 3.

TABLE 3

| Activation energy | Example 2 | Comparative Example 2 |
|---|---|---|
| Catalyzed step ($E_1$) | 143 KJ/mol K | 55 KJ/mol K |
| Autocatalyzed step ($E_2$) | 243 KJ/mol K | 163 KJ/mol K |

Figure 9:
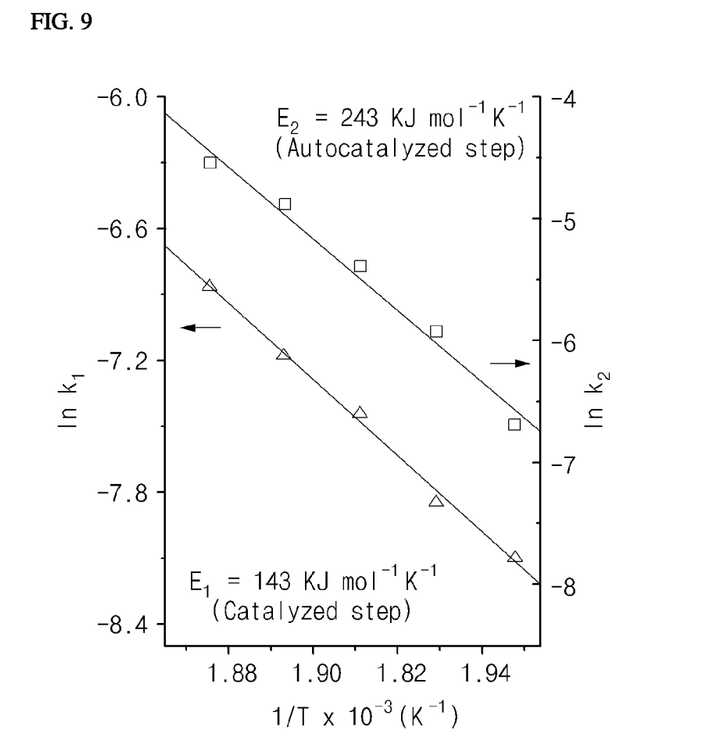
FIG. 9 is a graph illustrating the temperature dependence of reaction rate constants with respect to the isothermal cyclization reaction of Example 2.
Figure 10:
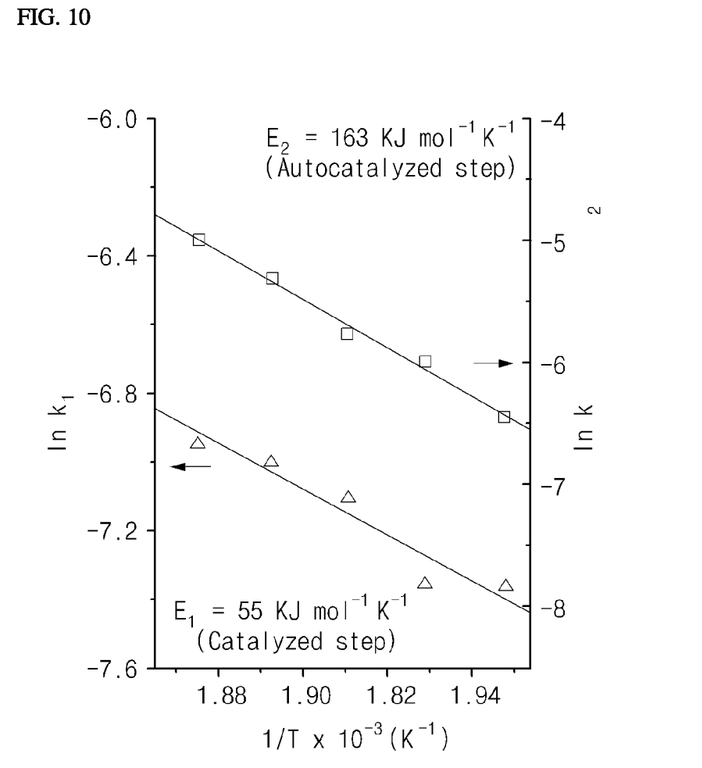
FIG. 10 is a graph illustrating the temperature dependence of reaction rate constants with respect to the isothermal cyclization reaction of Comparative Example 2.

Referring to FIGS. 9 and 10, it may be ascertained that the activation energy of Comparative Example 2 is considerably lower than that of Example 2. That is, it may be found that in Comparative Example 2 having a low activation energy, the reaction may occur rapidly and an explosive reaction may be performed to be unstable, the cyclization reaction may not be performed completely, and the reaction is not easy to control. Therefore, when the acrylate-based comonomer having a relatively large steric hindrance is applied as in Example 2 according to the present invention, the activation energy may be increased. Thus, it was ascertained that the cyclization reaction may be performed at a high conversion while controlling the cyclization reaction, and the damage of the fiber may be minimized by stable reaction.

The invention claimed is:

1. A method for producing a polyacrylonitrile-based fiber, the method comprising the steps of:
   (S1) producing a polyacrylonitrile (PAN)-based copolymer by polymerizing a monomer mixture including an acrylonitrile-based monomer, a carboxylic acid-based comonomer, and butyl acrylate such that the butyl acrylate comonomer is included in an amount of 10 to 20 parts by weight, based on 100 parts by weight of the monomer mixture;
   (S2) fiberizing the polyacrylonitrile-based copolymer; and
   (S3) oxidizing and stabilizing the fiberized polyacrylonitrile-based copolymer.

2. The method of claim 1, wherein the step (S2) comprises a coagulating process, a water washing process and a stretching process each of which is performed at least once at 5 to 15 reaction baths.

3. The method of claim 1, wherein the acrylonitrile-based monomer is acrylonitrile.

4. The method of claim 1, wherein the carboxylic acid-based comonomer is at least one selected from the group consisting of acrylic acid, methacrylic acid, ethacrylic acid, itaconic acid, crotonic acid, citraconic acid, maleic acid, and mesaconic acid.

* * * * *